INVENTORS.
PHILIP N. LEHR,
ADOLF REITLINGER &
GEORGE OBRIEN
BY
[signature]
their ATTORNEYS INVENTORS.
PHILIP N. LEHR,
ADOLF REITLINGER &
GEORGE O'BRIEN
BY
Campbell, Brumbaugh, Free & Graves
their ATTORNEYS.

United States Patent Office 2,979,575

Patented Apr. 11, 1961

2,979,575

COMMUNICATION SYSTEM

Philip N. Lehr, Huntington, George O'Brien, Merrick, and Adolf Reitlinger, Woodhaven, N.Y., assignors to Dictograph Products, Inc., a corporation of Delaware Filed Oct. 10, 1956, Ser. No. 615,106

13 Claims. (Cl. 179—175.25)

This invention relates to communication systems and more particularly communication systems protected against unauthorized listening as by tapping by means of various line tapping implements or by listening in on a receiver otherwise properly connected in the system.

In communication systems in which utmost secrecy is required, various attempts have been made to frustrate tapping either by probe means or inductively. Because inductive tapping techniques have been perfected to a point at which normal electromagnetic shielding techniques are unavailing and because probes have been developed which can tape the center of a secured cable either inductively or conductively but without short circuiting outer laminations of the cable, many of the well known techniques for establishing security in communications systems are unavailing.

In accordance with the present invention, there is provided a communication system which has been found to be effective against all known tapping techniques regardless of the sensitivity of the tapping instrments used and regardless of the care exercised by the person carrying out the tapping operation. In order to defeat inductive tapping, white noise is introduced into the system to establish an electromagnetic field which, while inducing a signal as much as 40 to 50 db below the level intensity of the actual intelligence transmission in the conducting core of the cables and junction boxes, effectively jams any of the intelligence signal which might be radiated from the system. Tapping by conductive probes is defeated by impressing a D.C. potential across shielding surfaces both throughout the cables of transmission and the junction boxes and connecting the surfaces in a circuit which is responsive to a bridging impedance which can be in the relatively high range, for example, of .1 megohm. Breakage of any part of the communication system can be detected by a continuity system which can make use of the same conducting media as are used in securing against inductive and conductive tapping.

A preferred embodiment of the invention from which the above and other features will be readily understood is described below having reference to the accompanying drawing in which.

Figures 1, 2, 2A:
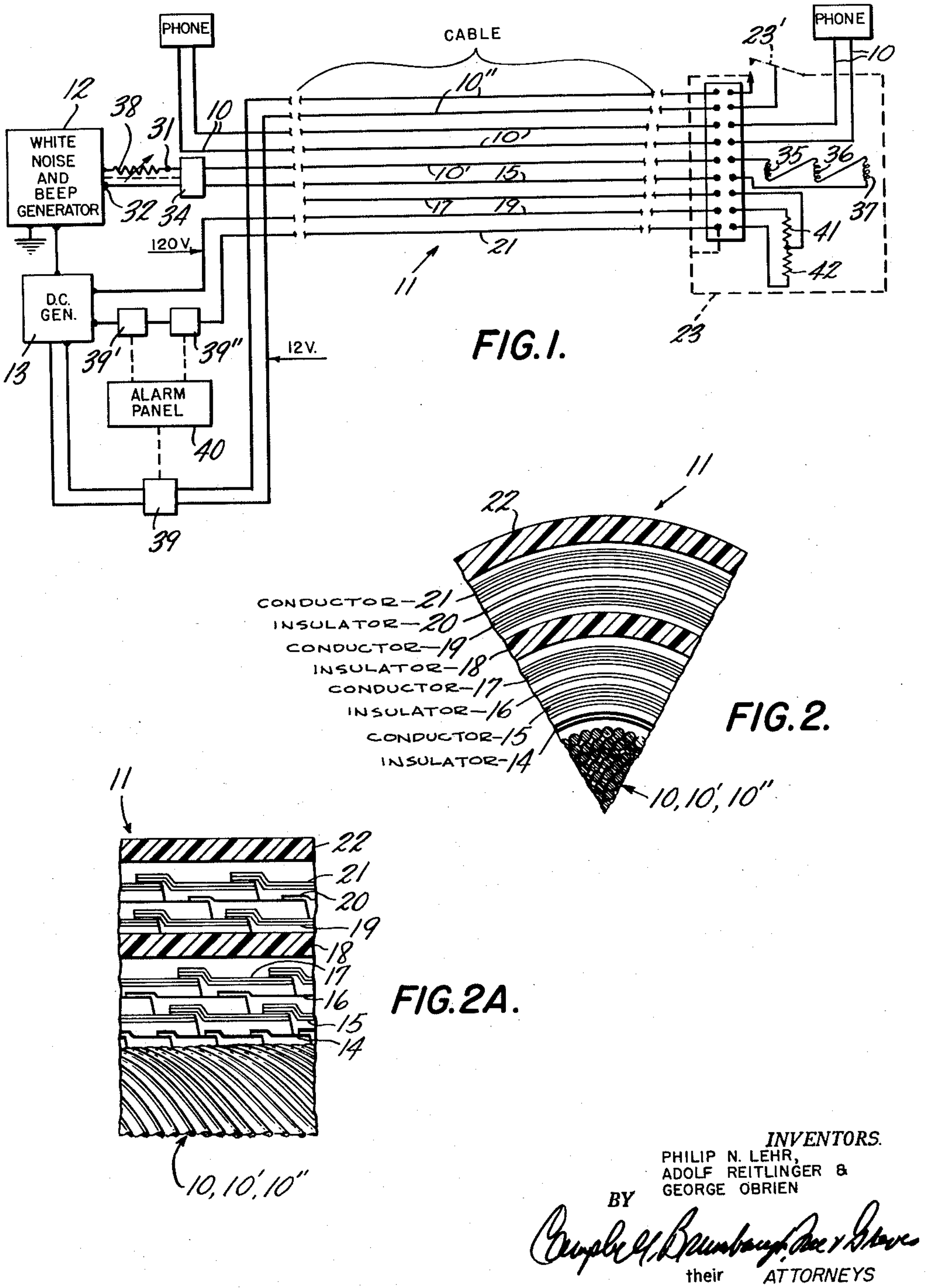
Figure 1 is a schematic diagram of the security section of a communicating system.
Figure 2 is an enlarged fragmentary view in longitudinal section of a security cable which can be used in the practice of the present invention.
Figure 2A is an enlarged diagrammatic view in transverse section of half of a security cable which can be used in the practice of the present invention.

Referring to Figure 1, there is illustrated, schematically, the security section of a communication system. The intelligence transmitted over the system is passed over electrical conductors 10 which are in the core section of a cable indicated generally by the numeral 11. The conductors 10 of the core section are, as best seen in Figure 2, preferably twisted upon themselves in spiral fashion for reasons to be described. The security system includes a white noise generator of conventional design for creating patternless electrical signals over a wide frequency spectrum and indicated generally by the numeral 12 for establishing jamming radiations at all points of the system including the cables, instrument cabinets, junction boxes, and the like, thereby obliterating any intelligence which might be radiated from the core section through the walls of the cables, instrument cabinets, junction boxes and the like. The system also includes a D.C. generating system indicated generally by the numeral 13 for impressing D.C. voltages across shielding components of the system, as described below, in such a manner that bridging even by a relatively high impedance, such as might be caused by an insulated probe, will be perceptible at a control center.

Figure 3:
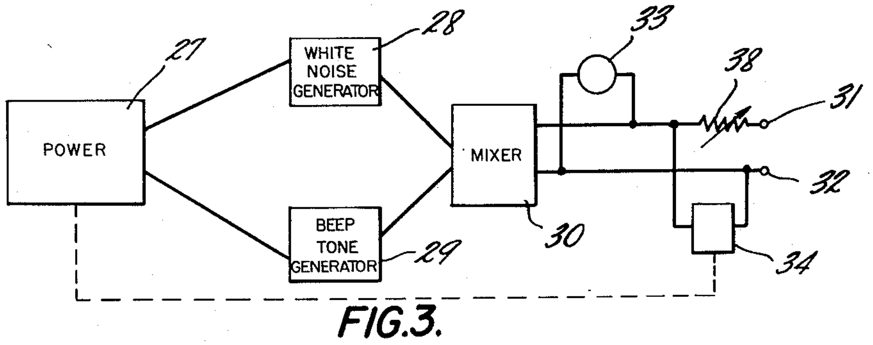
Figure 3 is a schematic diagram of a white noise generating system which can be used in the arrangement of Figure 1.

A representative security cable, which can be used in the practice of the present invention, is illustrated diagrammatically in Figures 1, 2 and 3. The complete structural details of such a cable are disclosed and claimed in Patent No. 2,922,835, dated January 26, 1960, to Philip N. Lehr. The cable 11 includes, in addition to the conductors 10 which form the core section, an insulating section 14 which can take the form, for example, of a spirally wound insulating ribbon, followed by a first electrically conducting cylindrical section 15, which can take the form, for example, of a spirally wound ribbon comprised of a central foil section covered on both sides with an insulating plastic layer, all as disclosed in said copending application. Following the first conducting section 15 is an insulating section 16 which can be formed of a spirally wound insulating strip, followed in turn by a second electrically conducting cylindrical section 17, which can be identical in construction to the section 15.

Following the second conducting section 17 is a heavy insulating sheath 18, preferably of weatherproof construction. Following in order after the insulating sheath 18, is a third electrically conducting cylindrical section 19, a dielectric or insulating section 20, and a fourth electrically conducting cylindrical section 21 followed by a suitable exterior covering or sheath 22, also of weatherproof construction. The electrically conducting sections 19 and 21 can be identical in construction with the section 14. If preferred, the foil ribbons of which the sections 15 and 17, as well as 19 and 21, are formed, can be wound two ribbons as one, in accordance with the disclosure of said copending application. Also, the wound ribbons can be bonded together.

The finished cable can be run through ducts, walls, or it can be buried underground. Its construction is such that it can be bent on a relatively sharp radius, such for example as 5 diameters, without destroying the effectiveness. Also, its insulating sheaths are preferably made resistant to chemical solvents which might be used in a tapping operation. Any solvents which might effectively penetrate the covering sheet would, however, necessarily be felt in the electrical portion of the system as described below.

Figure 4:
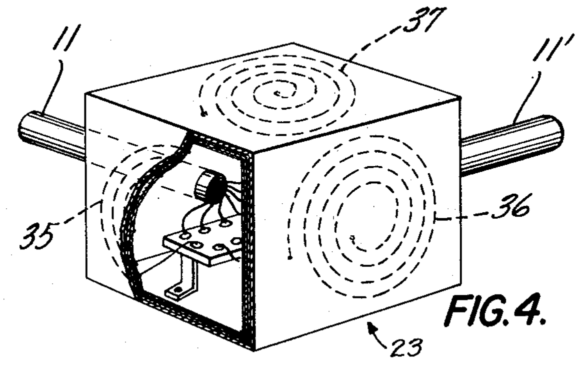
Figure 4 is a diagrammatic view in cross section of a typical junction box, instrument cabinet, or the like, within which various connections to security cables can be made and which is itself lincorporated in the security system.
Figure 4A:
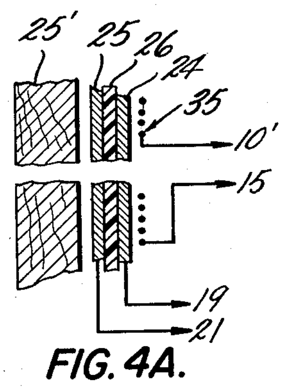
Figure 4A is an enlarged fragmentary view in cross section of a wall construction for the closure of Figure 4.

It will be understood that in the final illustration, all portions of the system at which junctions are provided between cable sections will be enclosed in housings which are also capable of being integrated in the security system, as are all telephone instruments that are to be secured. Referring to Figure 4, there is shown a representative housing construction 23 which can take the form of a junction box, instrument cabinet or the like. The wall construction of the housing is illustrated by Figure 4A as including a pair of copper foil sheets 24 and 25 between which is sandwiched an insulating sheet 26. The sheets 24 and 25 are preferably made of thin copper of a thickness on the order, for example of .0025, with the sheet 26 comprising a plastic sheet having a thickness of the order for example of .003 inch. The wall construction is completely by an external casing 25' of wood, for example. The outer foil 24, being tough and ductile, will be pushed through insulating sheet 26 by any probe piercing the wall, thereby short circuiting the two foils and setting off the alarm.

Referring now to Figure 3, the component parts of the white noise generator 12 are illustrated as including a power source 27 coupled to a white noise generator 28, which can be of conventional design based on oscillator driven movement of electrons in an insulator and which affords a patternless output signal embracing all frequencies over the audio spectrum and additional frequencies as desired. Also connected to the power source 27 is a beep tone generator 29 which can be of conventional design adapted to produce, for example, beep tones of approximately 1,000 c.p.s. at about one second spacing. The outputs of the white noise generator and the beep generator, 28 and 29, respectively, are fed to a mixer 30 having output terminals 31 and 32. If desired, an output level meter 33 can be connected across the mixer 30 as can a sensitivity relay 34.

Referring now to Figure 1, terminal 31 is connected to one of the conductors 10 of the core section of the cable and terminal 32 to one of the cylindrical conducting layers or sections, such for example as the section 15. The terminal 32 is common with the positive terminal of the D.C. generator. It has been found that impressing the white noise across a conductor in the core of the cable and one of the cylindrical conducting portions surrounding the core affords highly effective radiation of the white noise exteriorally of the cable, hence effectively performing its jamming function. It will be recalled that the conductors 10 of the core section of the cable are spirally wound or twisted. By this expedient, pick-up of the white noise by the intelligence conductors within the cable is minimized. In a representative system, for example, pick-up by two intelligence conductors inside the cable was found to be 40 to 60 db below the level of the intelligence signal and, therefore, barely audible. The beep tone, however, appeared as a very low level audible sound in the intelligence conductors, indicating to the user that the security provisions of the communication system are in operation.

Each of the the junction boxes or other housings through which the intelligence passes are also protected by the jamming white noise by winding three series connected loops about each box in mutually perpendicular planes. Referring to Figure 1, one set of these loops is indicated by the numerals 35, 36 and 37, the loops being shown in Figures 4 and 4A mounted on the junction box 23. As shown in Figure 1, an impedance matching device such for example as an adjustable impedance 38 is connected in the system in series with the loops, the impedance being preferably located, for convenience, at the white noise generator 12.

The D.C. generator 13, which can be of conventional design, affords two outputs, the first in the range of 120 volts and the second in the range of 12 volts. The 12 volt output is used to protect access doors to instrument cabinets, junction boxes and the like, such as the access door 23' of the box 23, continuity connections being establised through conductors 10'' in the cable core, switch means at the access doors, and suitable relay 39 responding to an open circuit and connected to actuate indicating means such as bells, lights, recorders or the like at a suitably located central panel 40. The 120 volt output is connected through a pair of relays 39' and 39'' across the cylindrical conducting sections 15—17 and 19—21 of the cable. The first relay 39' responding to an open circuit as might occur were continuity to be broken, such as would occur were a cable section 11 to be severed. The relay 39'' responds to a change in impedance across either or both of two pairs of cylindrical conducting sections of the cable, as would result in the event of short circuiting of the cable foils by a piercing probe. The relays 39 and 39'' also control the indicating means at the suitably located panel 40. The 120 volt output of the generator is also connected, in the illustrated embodiment, to the separated double walls of the various junction boxes and housings such for example as the walls 24 and 25 of the junction box 23. This connection can be effected, if desired, through the pairs of conducting sections 19 and 21.

Preferably, the cylindrical conducting sections 19 and 21 are bridged by a loading resistor series combination 41 and 42, the section 17 being connected to the center tap of those resistors.

In operation, with the white noise and beep generator 12 functioning to create a jamming field about all sections of the cable and about all junction boxes and housings and with the D.C. generator 13 functioning to generate D.C. potentials across both pairs of cylindrical conducting sections of the cable and also across the double conducting walls of the junction boxes and housings, full security against inductive and conductive tapping obtains. Any attempt to tap an intelligence conductor 10 within the cable by means of a probe will bridge the cylindrical conducting sections 15—17 and 19—21. This will actuate the relay 39'' to set off the alarm. Any break in the conducting sections will of course result in a perceptible open circuit indication by the relay 39' which will also set off alarm means. As stated, any attempt to open access doors to the several housing, junction boxes, or the like, will break the 12 volt continuity circuit so that the alarm will be sounded. Intelligence passing as electrical signals through the conductors 10 of the core section of the cable will first of all be shielded as to electromagnetic radiations by the several layers of conducting surfaces thereabout. Any leakage radiation which might otherwise evade the shielding layers, will be of a magnitude far below the level of the white noise radiations which also emanate from one or more of the shielding cylindrical sections, such as the section 15, and the several junction boxes and housings through the connections described.

In the event only one telephone unit is lifted from its cradle without establishing connections to another telephone in the system, high level beep noise will be heard. This is brought about by arranging the telephones so that when only one instrument is lifted from its cradle an open loop obtains. When telephones are picked up at each end of the line, a closed loop results, with the induction being cancelled out, the high noise level drops, and normal transmission characteristics obtain. However, the system is so arranged that any two parties talking over the system through legitimate connections will hear very faint tones, telling them that security devices are working. Also, in the event the intensity level of the white noise generator and the beep tone generator fall below safe values, the sensitivity relay 34 will automatically be actuated to shut down the entire system and initiate the operation of suitable alarms as might be desired.

While a preferred embodiment of the invention has been described above having reference to the accompanying drawings, it will be understood that the invention can take numerous forms and arrangements. As stated, different cable constructions can be used. In some cases, for example, one pair of shielding and radiating layers can be eliminated in the cable section.

Also, the white noise generator or oscillator can be connected across two conducting layers rather than across one layer and one inner conductor, although the latter has been found to give good results consistent with the induction of a low but audible noise level in the transmission lines to indicate the system is under protection. Also, it will be understood that junction boxes, instrument cabinets, panel boards, and the like, can be used in numbers and locations as required by particular systems. The invention should not, therefore, be regarded as limited except as defined in the appended claims.

We claim:

1. In a communication system, electrical conductor means for transmitting intelligence, first electrically conducting wall means surrounding the conductor means, second electrically conducting wall means surrounding the conductor means and separated electrically from the first wall means, said first and second electrically conducting wall means enveloping the conductor means in an imperforate continuous sheath white noise generating means connected to at least one of said conducting wall means and conductivity sensing means connected across said first and second wall means.

2. In a communication system, electrical conductor means for transmitting intelligence, first electrically conducting metallic foil means surrounding the conductor means, second electrically conducting metallic foil means separated electrically therefrom, said first and second foil means enveloping the conductor means in an imperforate continuous sheath, white noise generating means connected to at least one of said metallic foil means, D.C. voltage generating means connected across the first and second metallic foil means, and indicating means responsive to impedance change across the first and second metallic foil means.

3. A communication system as set forth in claim 2, including third and fourth electrically separated metallic foil means surrounding the first and second and electrically separated therefrom, and means to connect said D.C. generating means and indicating means thereacross.

4. A communication system as set forth in claim 2, said white noise generator being connected across at least one electrical conductor of said plurality and one of said electrically conducting metallic foil means.

5. In a communication system, electrical conductor means for transmitting intelligence, first electrically conducting wall means surrounding the conductor means, second electrically conducting wall means surrounding the conductor means and separated electrically from the first wall means, and white noise generating means including a beep tone generator, white noise generator, and means to mix the white noise and beep tones connected to at least one of said conducting wall means.

6. In a communication system, a transmission conduit comprising an electrical conductor means for transmitting intelligence, first electrically conducting wall means surrounding the conductor means, second electrically conducting wall means surrounding the conductor means and separated electrically from the first, at least one junction housing means in the transmission conduit, said housing means including wall means defining a closed space about the conductor means, a plurality of at least three series connected loops disposed about the space in mutually perpendicular planes, white noise generating means connected across the loops and at least one of said electrically conducting wall means of the transmission conduit, a D.C. generator connected across the first and second wall means, and indicating means responsive to impedance changes across the conducting wall means.

7. A communication system as set forth in claim 6, said wall means of the junction housing including spaced apart metallic foil sheets, and means to impress said D.C. voltage across the foil sheets.

8. In a communication system, a transmission conduit including a plurality of electrical conductors for conveying intelligence, said conductors being twisted together in spiral fashion to form a core section, first cylindrical electrically conducting metallic foil means surrounding the core section, second cylindrical electrically conducting metallic foil means surrounding the core section and electrically insulated from the first foil means but closely proximate thereto, D.C. generating means and impedance responsive means connected across the first and second foil means, white noise generating means connected across one conductor of said core section and one of said foil means, telephone instruments connected to said conductors, and alarm means operable by said impedance responsive means.

9. A communication system as set forth in claim 8 including at least one housing means connected to said transmission conduit, three series connected inductor loops inductively associated with said housing means and disposed in mutually perpendicular planes, and means to connect the white noise generator across said loops.

10. A communication system as set forth in claim 8, including third cylindrical electrically conducting metallic foil means surrounding the second foil means and spaced therefrom, and fourth cylindrical electrically conducting metallic foil means surrounding the second foil means and electrically insulated from but closely proximate to the third foil means, said D.C. generator also being connected across the third and fourth foil means.

11. A communication system as set forth in claim 8, including an audio beep tone generator connected to at least one of said metallic foils.

12. A communication system as set forth in claim 11, including means to combine the outputs of said beep tone generator and said white noise generator.

13. A communication system as set forth in claim 9, said housing means including walls having a pair of closely spaced electrically separated metallic foils therein, and means to connect the D.C. generator across the last said foils.

References Cited in the file of this patent

UNITED STATES PATENTS

| | | |
|---|---|---|
| 2,416,307 | Grieg | Feb. 25, 1947 |
| 2,521,690 | Clark | Sept. 12, 1950 |
| 2,691,698 | Schmidt | Oct. 12, 1954 |